US007040447B1

(12) United States Patent
Mawhinney

(10) Patent No.: US 7,040,447 B1
(45) Date of Patent: May 9, 2006

(54) PEDAL PUSHER

(76) Inventor: Bruce A Mawhinney, 328 Winnebago Trail, Fort Myers Beach, FL (US) 33931

(*) Notice: Subject to any disclaimer, the term of this patent is extended or adjusted under 35 U.S.C. 154(b) by 16 days.

(21) Appl. No.: 10/836,685

(22) Filed: Apr. 30, 2004

(51) Int. Cl.
*B60K 26/00* (2006.01)

(52) U.S. Cl. .................... 180/315; 74/473.16; 74/478; 74/481

(58) Field of Classification Search ................ 180/315, 180/333, 336; 74/473.1, 473.16, 473.17, 74/478, 481, 482
See application file for complete search history.

(56) References Cited

U.S. PATENT DOCUMENTS

| | | | | | |
|---|---|---|---|---|---|
| 2,953,036 | A | * | 9/1960 | Wendt | 74/484 R |
| 4,324,309 | A | * | 4/1982 | Ginley | 180/316 |
| 4,436,191 | A | * | 3/1984 | Perry | 477/209 |
| 4,438,835 | A | * | 3/1984 | Dowden et al. | 477/193 |
| 5,022,477 | A | * | 6/1991 | Wanie | 180/6.34 |
| 5,025,905 | A | * | 6/1991 | Lenz | 477/209 |
| 5,129,492 | A | * | 7/1992 | Lenz et al. | 477/27 |
| 5,542,312 | A | * | 8/1996 | Peters | 74/481 |
| 5,553,992 | A | * | 9/1996 | Ashcroft | 414/685 |
| 6,131,712 | A | * | 10/2000 | Rhodenizer | 188/352 |
| 6,279,937 | B1 | * | 8/2001 | Hunt | 180/336 |

* cited by examiner

*Primary Examiner*—Paul N. Dickson
*Assistant Examiner*—Toan C To

(57) ABSTRACT

A pedal pusher to provide for hand manipulation of a pedal of a motor vehicle, such as a golf cart, is disclosed. Means are disclosed to provide for release of a substantial portion of the device where the pedal of the vehicle may be operated without substantial interference by the portion of the device remaining attached to the pedal of the vehicle. Means are disclosed to provide for angular adjustment of the device to a desired orientation relative to the seat of the vehicle for the comfort of the operator. Means are disclosed to provide for length adjustment for selectively adjusting a length of the device within a length range of motion for the comfort of the operator.

13 Claims, 3 Drawing Sheets

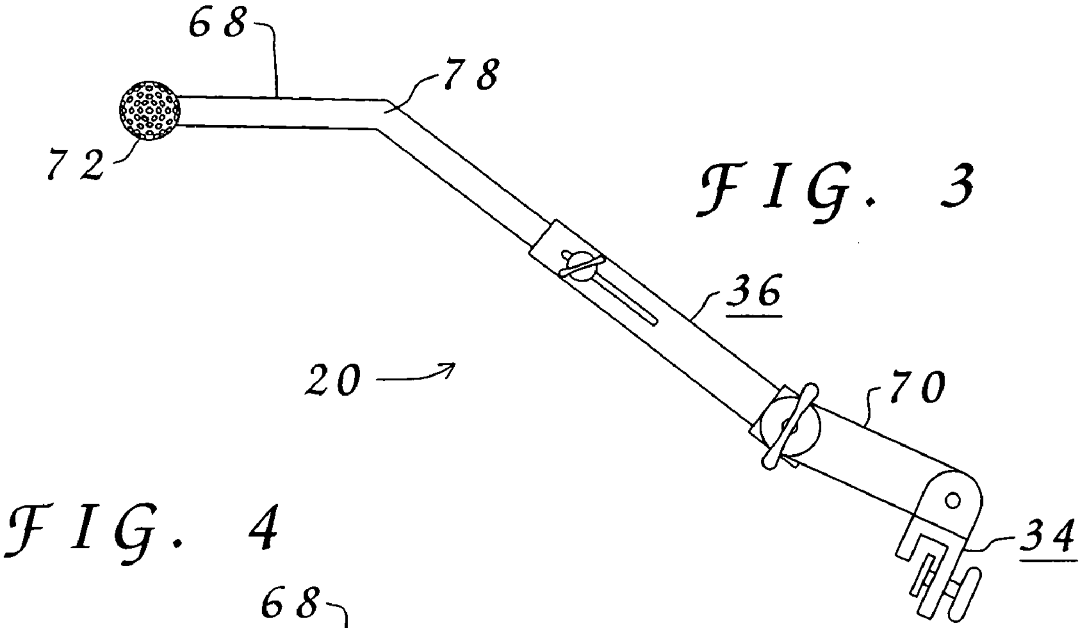
FIG. 3
FIG. 4
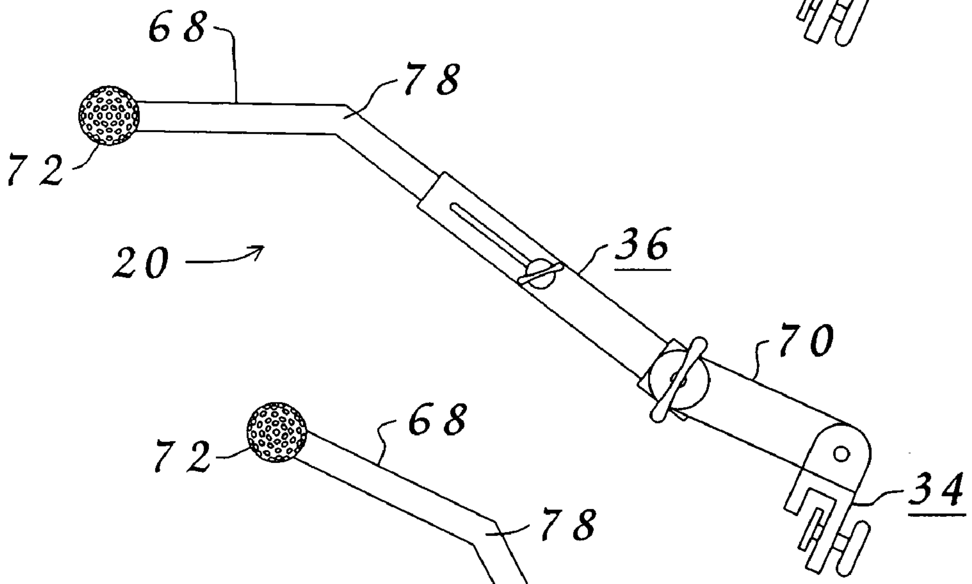
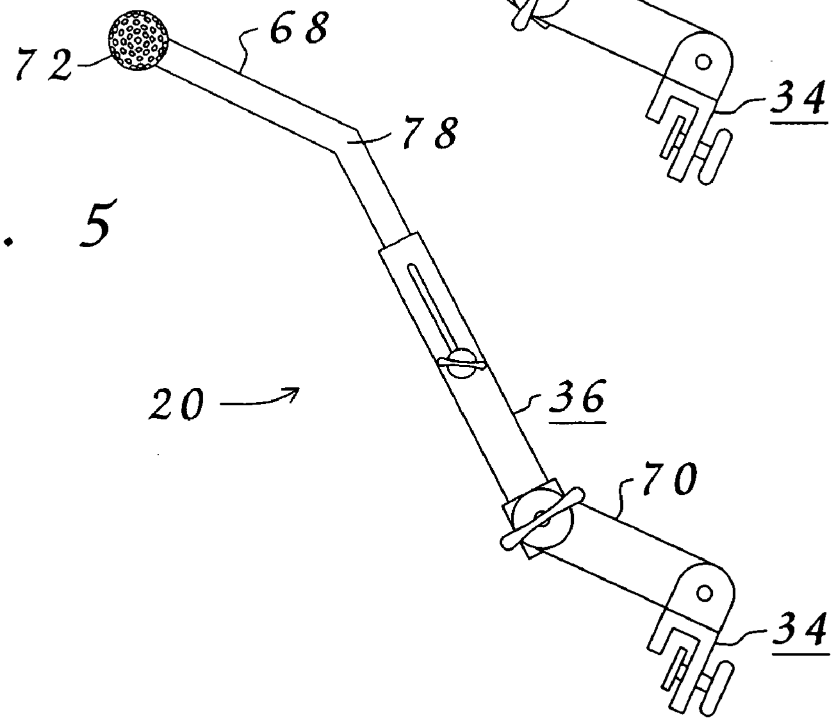
FIG. 5

PEDAL PUSHER

BACKGROUND

1. Field of the Invention

Generally, the invention relates to pedal manipulation devices for motorized vehicles. More specifically, the invention relates to such devices which are hand operated and which operate directly upon the pedal of the motorized vehicle.

2. Description of the Prior Art

The present invention is an improvement upon applicant's invention disclosed in Canadian Patent application CA2359745 filed Oct. 4, 2001 and laid open for public inspection Feb. 19, 2002 and currently awaiting issuance.

Various devices are known in the art to provide persons having limited dexterity with the ability to operate motor vehicles. These include devices which provide the operator of the motor vehicle with the ability to manipulate operation of an accelerator pedal of the vehicle utilizing their hands. Typically these devices are complicated and operate directly upon the mechanisms of the vehicle controlled by the pedal and not upon the pedal proper.

Golf carts and other motorized vehicles which are intended to be used in non highway situations are often used to move about at low speeds such as on or about golf courses or in generally closed residential communities such as mobile home parks and gated communities. Many persons who would benefit from use of such motorized vehicles are unable to enjoy such use due to limited dexterity or other physical disabilities.

As such, it may be appreciated that there continues to be a need for a simple device which will allow the user of motorized vehicles to operate the foot pedal using their hand while not limiting conventional usage of the motorized vehicle by other operators. The present invention substantially fulfills these needs.

SUMMARY

In view of the foregoing disadvantages inherent in the known methods for controlling operation of a pedal of a motor vehicle your applicant has devised a hand operated control device to provide for control of a pedal mounted relative to a floor of the motor vehicle. Applicable motor vehicles have a seat positioned relative to the pedal for an operator of the motor vehicle. The pedal of the vehicle has an elevated neutral position and a depressed operating position. The hand operated control device has a connection portion, an extension portion and angular adjustment means. The connection portion attaches to the pedal of the motor vehicle. The extension portion has a user manipulation end and a distal end with the distal end positioned relative to the connection portion attached to the pedal. The user manipulation end has a user contact portion to provide for operator control of the extension portion in a range of motion along an arc. The range of motion has a lower position and an upper position. The lower position of the range of motion provides for placement of the pedal of the motor vehicle in the elevated neutral position. The upper position of the range of motion provides for placement of the pedal of the motor vehicle at least toward the depressed operating position from the elevated neutral position. The angular adjustment means provides for selective placement of the extension portion relative to the connection portion at a desired angle of protrusion where the extension portion may be positioned at a user selected desired orientation relative to the seat of the motor vehicle.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a hand operated control device which will permit hand manipulation of a foot pedal of a vehicle where persons having physical limitations may enjoy the use of their vehicles.

Other objects include:

a) to provide for a hand operated control device having the capacity to be easily removed and reattached to permit ready use of the vehicle with or without the hand operated control device.

b) to provide for a hand operated control device having adjustment capabilities to permit ready adjustment of a length of the hand operated control device for comfortable usage.

c) to provide for a hand operated control device having adjustment capabilities to permit ready adjustment of an angle of extension from the pedal of the vehicle for comfortable usage.

d) to provide for a user contact portion of the extension portion of the hand operated control device to have a spherical shape and dimples positioned thereon where the user contact portion resembles a golf ball.

e) to provide for a hand operated control device which safely returns the pedal to an elevated neutral position when the hand operated control device is not manipulated by the operator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 3 is an enlarged elevational view of the hand operated control device shown in FIG. 1.

FIG. 4 is an elevational view of the hand operated control device shown in FIG. 3 following adjustment of the length of an extension portion.

FIG. 5 is an elevational view of the hand operated control device shown in FIG. 4 following adjustment of an angle of protrusion of the extension portion relative to a connection portion.

DESCRIPTION

Figure 1:
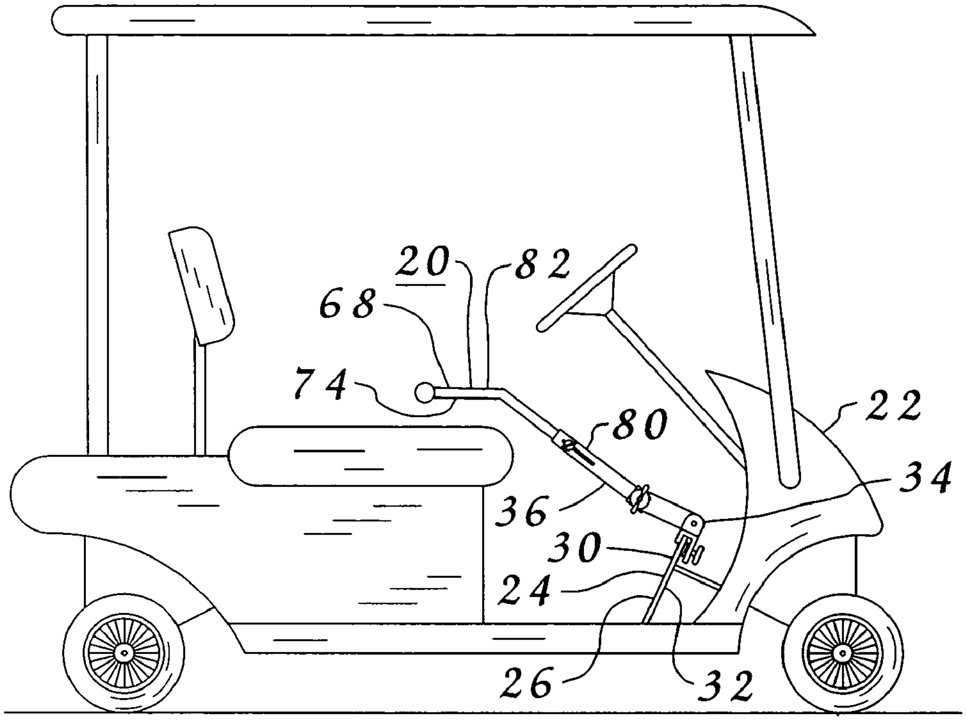
FIG. 1 is an elevational view of a golf cart with a hand operated control device positioned thereon and in a first operational orientation.

Many different pedal pushers, or hand operated control devices, having features of the present invention are possible. The following description describes the preferred embodiment of select features of those hand operated control devices and various combinations thereof. These features may be deployed in various combinations to arrive at various desired working configurations of hand operated control devices.

Reference is hereafter made to the drawings where like reference numerals refer to like parts throughout the various views.

Figure 2:
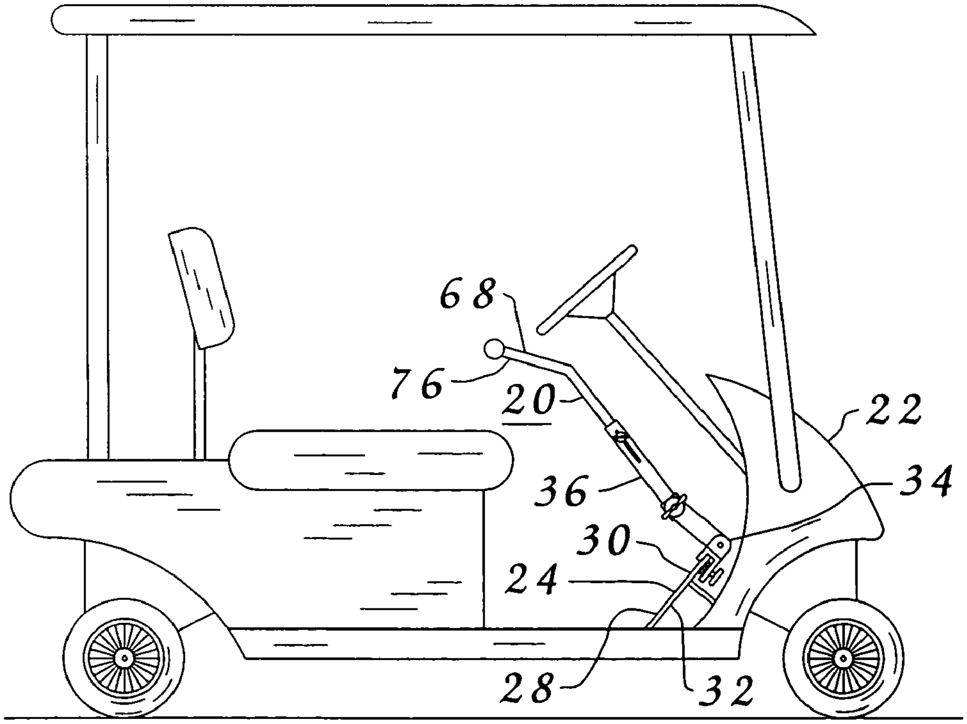
FIG. 2 is an elevational view of the golf cart and hand operated control device shown in FIG. 1 with the hand operated control device in a second operational orientation.

A hand operated control device 20, a pedal pusher, is depicted in the various views. FIG. 1 and FIG. 2 depict hand operated control device 20 positioned on a motor vehicle 22, in the form of a golf cart. A pedal 24 is mounted relative to a floor of motor vehicle 22 where an operator, not shown in any of the various views, of motor vehicle may manipulate pedal 24 while resting on a seat of motor vehicle 22.

FIG. 1 depicts pedal 24 of motor vehicle 22 in an elevated neutral position 26 while FIG. 2 depicts pedal 24 in a depressed operating position 28. Pedal 24 has an upper user contact surface 30 and a backing surface 32 opposing upper user contact surface 30.

Hand operated control device 20 has a connection portion 34 and an extension portion 36, see FIG. 3 through FIG. 5. It is a requirement that hand operated control device 20 be attached to pedal 24. Many structural arrangements may be employed to provide this function. It is a strong desire that the extension portion be releaseable and removable from the connection portion. Many structural arrangements may be employed to provide this function. Connection portion 34 is formed of a pedal bracket 38, see FIG. 6, capable of being positioned on pedals having a variety of thicknesses. Pedal bracket 38 has a pedal slot 40 into which pedal 24 is positioned. An upper contact portion 42 engages a small portion of upper user contact surface 30 of pedal 24. If desired various structural configurations may be employed on upper contact portion 42 to enhance retention properties relative to upper user contact surface 30. A lower contact portion 44, in the form of tightening pads 46, engage backing surface 32 of pedal 24. Securing means in the form of tightening knobs 48 having threads thereon penetrate threaded apertures 50 of pedal bracket 38. Tightening knobs 48 provide for an application of a binding pressure between upper contact portion 42 and lower contact portion 44 to bind connection portion 34 to pedal 24 of motor vehicle 22. In typical usage connection portion 34 will remain attached to pedal 24 even when a substantial portion of hand operated control device 20 is removed from motor vehicle 22.

Pedal bracket 38 has opposing spaced engagement tabs 52 having a passage 54 therebetween. Each engagement tab 52 has an aperture 56 therethrough to receive a shaft 58 of a locking member 60. Locking member 60 has locking means as conventionally known in the art to retain locking member 60 within apertures 56.

Passage 54 receives an extension bar 62 having an aperture 64 therethrough. When extension bar 62 is positioned in passage 54 and locking member 60 is installed extension bar 62 is securely retained relative to pedal bracket 38, a part of connection portion 34. Extension bar 62 has an opposing aperture 66 positioned thereon.

Extension portion 36 has a user manipulation end 68 and a distal end 70. Manipulation of user manipulation end 68 of extension portion 36 provides for transfer of pedal 24 between elevated neutral position 26 and depressed operating position 28. Distal end 70 is positioned relative to connection portion 34. User manipulation end 68 has a user contact portion 72 to provide for operator control of extension portion 36 in a range of motion along an arc. The range of motion has a lower position 74, see FIG. 1, and an upper position 76, see FIG. 2. In the preferred embodiment depicted user contact portion 72 of extension portion 36 has a spherical shape and dimples positioned thereon where user contact portion 72 resembles a golf ball. In a most preferred embodiment an actual golf ball is used to form user contact portion 72.

Preferably extension portion 36 will have an angular offset 78 positioned between user manipulation end 68 and distal end 70 where extension portion 36 extends relative to pedal 24 in a first directional orientation 80 and then extends toward user manipulation end 68 in a second directional orientation 82, see FIG. 1. This arrangement provides for comfortable usage of hand operated control device 20.

Release means, in the form of pedal bracket 38, locking member 60 and extension bar 62, provides for selective release of extension portion 36 from connection portion 34. This provides for pedal 24 of motor vehicle 22 to be operated without substantial interference by hand operated control device 20 when at least a substantial portion of extension portion 36 is removed.

It is a desire to provide angular adjustment means to provide for selective placement of the extension portion relative to the connection portion at a desired angle of protrusion wherein the extension portion may be positioned at a desired orientation relative to the seat of the motor vehicle. Many structural arrangements may be employed to provide this function.

Figure 6:
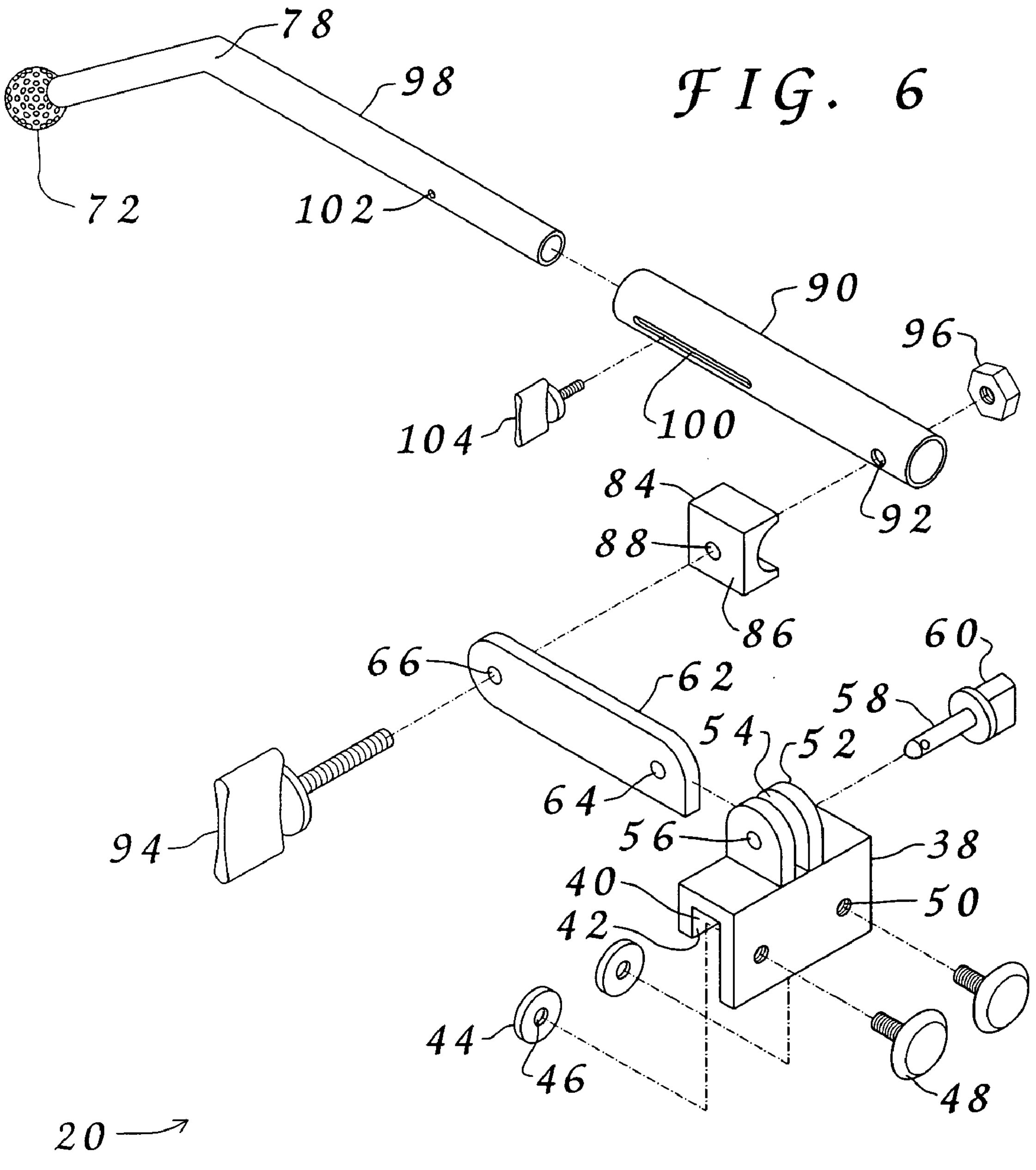
FIG. 6 is an exploded perspective view of the hand operated control device.

FIG. 6 depicts extension bar 62 having opposing aperture 66 therethrough. A contact bracket 84 has a contact surface 86 thereon having a texture thereto. Contact bracket 84 has an aperture 88 therethrough. A bracket contact surface, not shown, of extension bar 62 has a texture thereon which contacts contact surface 86 of contact bracket 84. Contact bracket 84 contacts, in a non-rotational manner, a second shaft 90. Second shaft 90 has an aperture 92 therethrough. A coupling member in the form of a wing nut 94 and a nut 96 cooperate to provide a binding pressure to retain extension portion 36 in a desired orientation relative to connection portion 34. Wing nut 94 having a shaft portion passes through opposing aperture 66 of extension bar 62 and through aperture 88 of contact bracket 84 and through apertures 92 of second shaft 90 and is secured therein by nut 96. The binding pressure produced by the coupling member acts upon the textured surfaces in contact to prevent rotation about the axis formed by wing nut 94.

It is a desire to provide length adjustment means to provide for selectively adjusting a length of the extension portion within a length range of motion where the user contact portion may be positioned at a desired orientation relative to the pedal of the motor vehicle. Many structural arrangements may be employed to provide this function. A first shaft 98 is slidably positionable within second shaft 90. Second shaft 90 has a slot 100 therealong while first shaft 98 has a threaded aperture 102 therethrough. A locking member, in the form of a threaded wingnut 104, is positioned through slot 100 and into threaded aperture 102 to provide a binding pressure between first shaft 98 and second shaft 90. Following placement of first shaft 98 at a desired orientation relative to pedal 24 the binding pressure applied by threaded wingnut 104 retains first shaft 98 at the desired orientation.

FIG. 3 depicts hand operated control device 20 adjusted to a substantially lengthened orientation while FIG. 4 and FIG. 5 each depict hand operated control device 20 adjusted to a substantially shortened orientation. FIG. 3 and FIG. 4 each depict hand operated control device 20 adjusted to a substantially straight orientation while FIG. 5 depicts hand operated control device 20 adjusted to a substantially angled orientation.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand operated control device to provide for control of a pedal mounted relative to a floor of a motor vehicle, the motor vehicle having a seat positioned relative to the pedal for an operator of the motor vehicle, the pedal having an elevated neutral position and a depressed operating position, the hand operated control device comprising:

a) a connection portion for attachment to the pedal of the motor vehicle;

b) an extension portion having a user manipulation end and a distal end, the distal end positioned relative to the connection portion, the user manipulation end having a user contact portion to provide for operator control of the extension portion in a range of motion along an arc, the range of motion having a lower position and an upper position, and wherein the lower position of the range of motion provides for placement of the pedal of the motor vehicle in the elevated neutral position and wherein the upper position of the range of motion provides for placement of the pedal of the motor vehicle at least toward the depressed operating position from the elevated neutral position;

c) angular adjustment means to provide for selective placement of the extension portion relative to the connection portion at a desired angle of protrusion wherein the extension portion may be positioned at a desired orientation relative to the seat of the motor vehicle.

2. The hand operated control device defined in claim 1 wherein the pedal of the motor vehicle further comprises an upper user contact surface and a backing surface opposing the upper user contact surface, and wherein the connection portion further comprises:

a) an upper contact portion to engage a small portion of the upper user contact surface of the pedal;

b) a lower contact portion to engage the backing surface of the pedal;

c) securing means to provide for applying a binding pressure between the upper contact portion and the lower contact portion to bind the connection portion to the pedal of the motor vehicle.

3. The hand operated control device defined in claim 1 wherein the extension portion further comprises an angular offset positioned between the user manipulation end and the distal end wherein the extension portion extends relative to the pedal in a first directional orientation and then extends toward the user manipulation end in a second directional orientation.

4. The hand operated control device defined in claim 1 wherein the user contact portion of the extension portion has a spherical shape and dimples positioned thereon wherein the user contact portion resembles a golf ball.

5. The hand operated control device defined in claim 1 wherein the angular adjustment means further comprises:

a) a first textured surface positioned relative to the extension portion, the first textured surface having an aperture therethrough;

b) a second textured surface positioned relative to the extension portion, the second textured surface having an aperture therethrough;

c) a coupling member having a shaft portion and a locking portion wherein the shaft portion extends through the aperture of the first textured surface and the aperture of the second textured surface with the first textured surface facing the second textured surface and wherein the locking portion cooperates with the shaft portion to provide a binding pressure to retain the extension portion in the desired orientation.

6. The hand operated control device defined in claim 1 further comprising release means to provide for selective release of the extension portion from the connection portion.

7. A hand operated control device to provide for control of a pedal mounted relative to a floor of a motor vehicle, the motor vehicle having a seat positioned relative to the pedal for an operator of the motor vehicle, the pedal having an elevated neutral position and a depressed operating position, the hand operated control device comprising:

a) a connection portion for attachment to the pedal of the motor vehicle;

b) an extension portion having a user manipulation end and a distal end, the distal end positioned relative to the connection portion, the user manipulation end having a user contact portion to provide for operator control of the extension portion in a range of motion along an arc, the range of motion having a lower position and an upper position, and wherein the lower position of the range of motion provides for placement of the pedal of the motor vehicle in the elevated neutral position and wherein the upper position of the range of motion provides for placement of the pedal of the motor vehicle at least toward the depressed operating position from the elevated neutral position;

c) release means to provide for selectively releasing at least a substantial portion of the extension portion relative to the connection portion wherein the pedal of the motor vehicle may be operated without substantial interference by the hand operated control device;

d) angular adjustment means to provide for selective placement of the extension portion relative to the connection portion at a desired angle of protrusion wherein the extension portion may be positioned at a desired orientation relative to the seat of the motor vehicle.

8. The hand operated control device defined in claim 7 wherein the user contact portion of the extension portion has a spherical shape and dimples positioned thereon wherein the user contact portion resembles a golf ball.

9. The hand operated control device defined in claim 7 wherein the motor vehicle further comprises a golf cart.

10. A hand operated control device to provide for control of a pedal mounted relative to a floor of a golf cart, the golf cart having a seat positioned relative to the pedal for an operator of the golf cart, the pedal having an elevated neutral position and a depressed operating position, the hand operated control device comprising:

a) a connection portion for attachment to the pedal of the golf cart;

b) an extension portion having a user manipulation end and a distal end, the distal end positioned relative to the connection portion, the user manipulation end having a user contact portion to provide for operator control of the extension portion in a range of motion along an arc, the range of motion having a lower position and an upper position, and wherein the lower position of the range of motion provides for placement of the pedal of the golf cart in the elevated neutral position and wherein the upper position of the range of motion provides for placement of the pedal of the golf cart at least toward the depressed operating position from the elevated neutral position;

c) length adjustment means to provide for selectively adjusting a length of the extension portion within a length range of motion wherein the user contact portion may be positioned at a desired orientation relative to the pedal of the golf cart;

d) angular adjustment means to provide for selective placement of the extension portion relative to the connection portion at a desired angle of protrusion wherein the extension portion may be positioned at a desired orientation relative to the seat of the golf cart.

11. The hand operated control device defined in claim 10 wherein the user contact portion of the extension portion has a spherical shape and dimples positioned thereon wherein the user contact portion resembles a golf ball.

12. The hand operated control device defined in claim 10 wherein extension portion further comprises a first shaft and a second shaft and wherein the length adjustment means further comprises an aperture penetrating the first shaft of the extension portion and a slot positioned along the second shaft of extension portion and a locking member positioned through the slot and the aperture.

13. The hand operated control device defined in claim 12 wherein the aperture of penetrating the first shaft of the extension portion is threaded.

* * * * *